United States Patent [19]

Priestley

[11] Patent Number: 5,252,978
[45] Date of Patent: Oct. 12, 1993

[54] COLLISION WARNING SYSTEM

[75] Inventor: Roger N. Priestley, Fife, United Kingdom

[73] Assignee: GEC Ferranti Defence Systems Limited, Stanmore, United Kingdom

[21] Appl. No.: 913,665

[22] Filed: Jul. 16, 1992

[30] Foreign Application Priority Data

Jul. 27, 1991 [GB] United Kingdom ............... 9116294

[51] Int. Cl.⁵ ................................. G01S 13/93
[52] U.S. Cl. ........................... 342/29; 342/32; 342/38; 342/65
[58] Field of Search .......... 342/29, 30, 32, 38, 342/65, 55, 57, 58

[56] References Cited

U.S. PATENT DOCUMENTS

| | | | |
|---|---|---|---|
| 3,750,166 | 7/1973 | Dearth | 343/6 |
| 3,836,961 | 9/1974 | Ennis et al. | 342/55 |
| 3,925,750 | 12/1975 | Gilbert et al. | 340/27 |
| 4,144,571 | 3/1979 | Webber | 342/65 X |
| 4,224,669 | 9/1980 | Brame | 342/65 X |
| 4,646,244 | 2/1987 | Bateman et al. | |
| 4,835,537 | 5/1989 | Manion | 342/30 |
| 5,111,400 | 5/1992 | Yoder | 342/29 X |
| 5,122,804 | 6/1992 | Shulenberger | 342/32 X |

FOREIGN PATENT DOCUMENTS

| | | |
|---|---|---|
| 0171751 | 2/1986 | European Pat. Off. |
| 3026224 | 2/1982 | Fed. Rep. of Germany |
| 80/02743 | 12/1980 | PCT Int'l Appl. |
| 86-330324 | 5/1986 | U.S.S.R. |
| 1447985 | 9/1976 | United Kingdom |
| 1490588 | 11/1977 | United Kingdom |

Primary Examiner—T. H. Tubbesing
Attorney, Agent, or Firm—Spencer, Frank & Schneider

[57] ABSTRACT

A collision warning signal for at least one vehicle is provided by transmitting from the surface of the earth a radio signal, receiving at the surface of the earth, a radio signal returned by a vehicle in response to the transmitted radio signal, determining an elapsed time between the transmitting of the radio signal and the receiving of the corresponding returned radio signal, determining the position of the vehicle at least in part in dependence upon the determined elapsed time, comparing the determined position of the vehicle with terrain data stored in a data base, and generating a warning signal based on the comparison if predetermined parameters are satisfied.

14 Claims, 3 Drawing Sheets

COLLISION WARNING SYSTEM

FIELD OF THE INVENTION

1. Background Of The Invention

This invention relates to a collision warning system and in particular but not exclusively to a system for warning aircraft that are in danger of colliding with the terrain or obstructions within a particular region.

2. Background Information

Civil airliners presently use a system termed ground proximity warning which warns of potentially dangerous situations where collision with the terrain may occur. The system relies on measuring the clearance between the aircraft and the terrain immediately below the aircraft and operates by examining the rate of aircraft descent, as measured by a barometric altimeter, and the aircraft's ground clearance to generate a warning if the rate of descent is dangerously high for a given ground to aircraft separation. This system is adequate for use in regions where the terrain is flat or gently undulating, but provides no warning of obstacles in front of the aircraft for example a mountain range or radio mast, which is of critical importance when flying at night or in bad visibility.

Apart from the operational limitations of the system described above, there is also the problem that to measure the clearance between the ground and the aircraft a radar altimeter is normally employed. Such a device is relatively expensive and therefore it has not been made mandatory for smaller airliners or aircraft.

An alternative system, disclosed in U.S. Pat. No. 4,646,244, proposes a ground proximity warning system using a stored terrain data base, within the aircraft, of the geographical areas of interest. However, such a system relies on the correct position of the aircraft being known from a navigation system in the aircraft, for example satellite navigation systems or inertial navigation systems. Such equipment may be available on larger commercial airliners but again is expensive and is unlikely to be carried by smaller airliners or aircraft.

SUMMARY OF THE INVENTION

According to the present invention there is provided a collision warning system comprising: a terrain data base; a radar station located on the earth's surface; means for determining the position of a vehicle from the output of the radar, and a comparator for comparing the position of the vehicle with the terrain data base and generating a warning signal if predetermined parameters are satisfied.

By employing a system in accordance with the invention it is possible to have a land or sea based radar and terrain data base covering a region around and/or including an airport or harbor. The infrastructure associated with the system can be used by a plurality of vehicles, the only requirement being that the vehicles comprise means for receiving the signal, for example a radio.

Preferably the terrain data base also stores the position of obstructions such as radio masts, pylons or piers so that it can also provide a warning of these.

Advantageously the comparator generates a vehicle velocity vector, and this vector is projected forward of the vehicle by a distance which that vehicle, on its present heading and velocity, will travel in a predetermined period, thereby providing the vehicle with a known time period of clear travel unless a warning is given.

In one embodiment the warning signal is generated if the velocity vector intersects the terrain in a region as determined from the terrain data base. However in an alternative embodiment the warning can be generated if the velocity vector comes within a predetermined distance of the terrain as determined from the terrain data base, thereby providing a safety margin allowing for changes in the terrain such as the erection of man-made obstructions, and ensuring the vehicle does not come within a predetermined distance of any obstruction.

It is advantageous that the warning signal is transmitted directly to the vehicle thereby removing any delay in an operator having to transmit the signal via a radio message. In this case it is beneficial if the warning is transmitted accompanied by a code such that only the vehicle in danger of collision is responsive to the signal thereby preventing false alarms being given to other vehicles.

The system is particularly applicable wherein the vehicle is an aircraft and it is preferable that the aircraft carries a transponder which is interrogated by the base station, and supplies the base station with the altitude of the aircraft. The ground base radar then only has to determine the bearing of the aircraft and not the angle of inclination. Such a system for use by aircraft may advantageously employ an airport secondary surveillance radar.

BRIEF DESCRIPTION OF THE DRAWINGS

The invention will now be described by way of example only with reference to the accompanying Figures of which.

DETAILED DESCRIPTION OF THE PREFERRED EMBODIMENT

Figure 1:
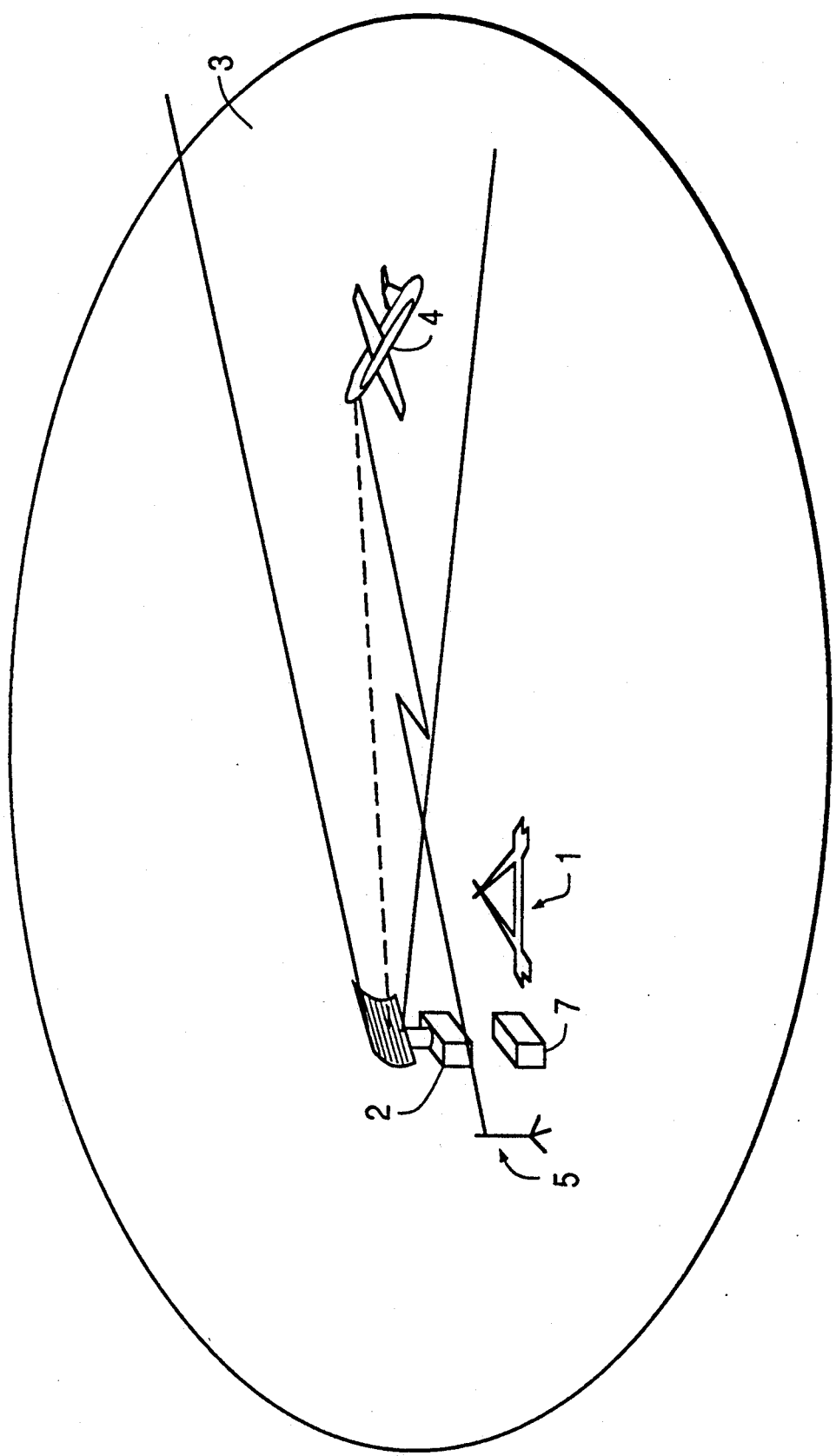
FIG. 1 schematically illustrates an application of the system in accordance with the invention for use at an airport.
Figure 2:
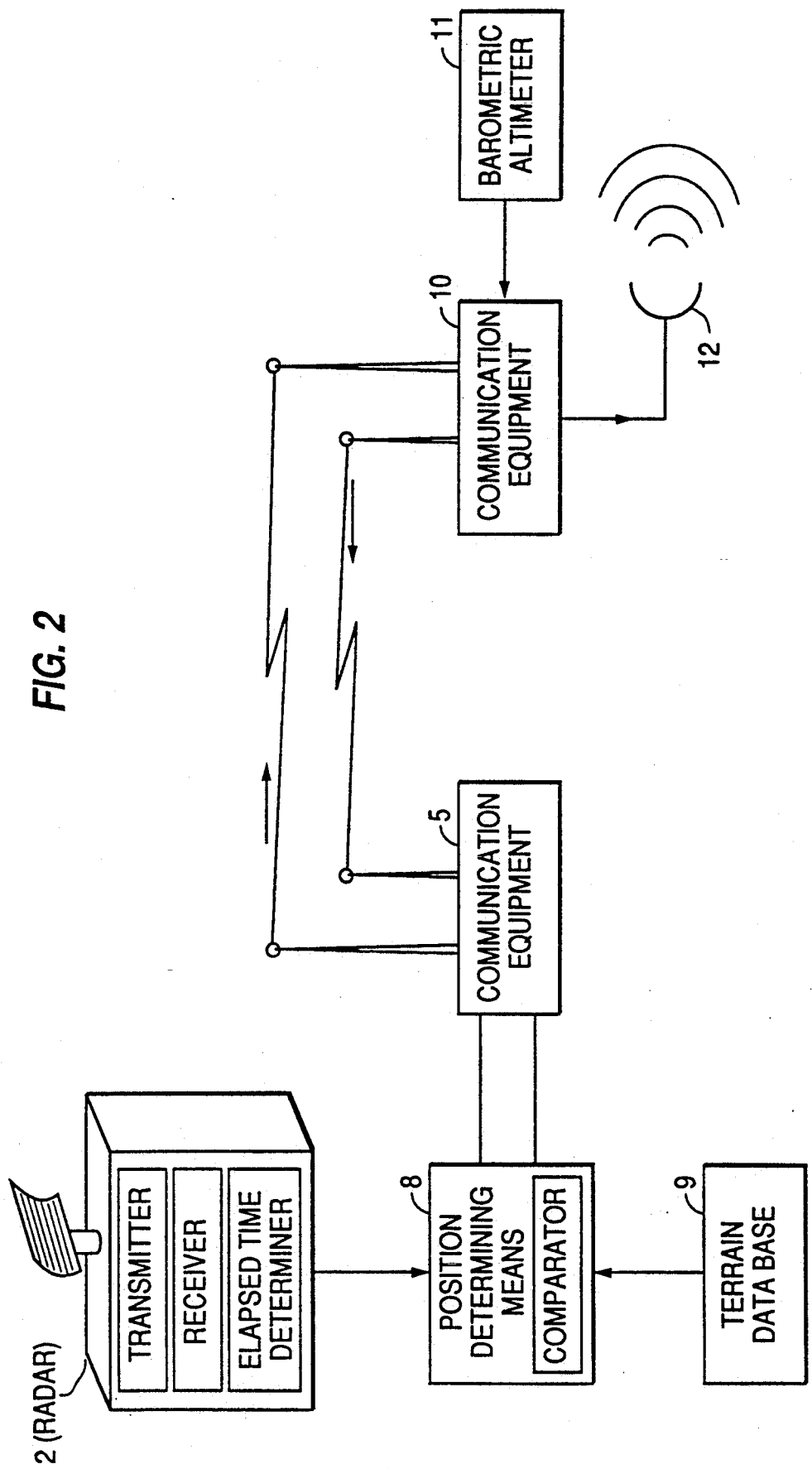
FIG. 2 diagrammatically illustrates components of the system of FIG. 1.

Referring firstly to FIG. 1, an airport 1 has a secondary surveillance radar 2 which scans a region 3 adjacent to the airport in which incoming and outgoing aircraft 4 will be relatively low flying. Radio communication equipment 5 transmits information between an airport control room 7 and the aircraft 4. The room houses the comparator 8 and terrain data base 9 illustrated in FIG. 2. From FIG. 2 the ground based part of the system is seen to comprise radar 2, comparator 8, terrain data base 9 and transmitter-receiver communication equipment 5. The aircraft comprises transmitter-receiver communication equipment 10, barometric altimeter 11 and speaker 12. When aircraft 4 of FIG. 1 is located, the bearing of the aircraft is obtained via the radar 2 and transmitted to the comparator 8. The comparator 8 activates transmitting-receiver 5 which transmits a signal to the transmitter-receiver 10 on the aircraft which in response to the signal obtains the value of the altitude of the aircraft from the barometric altimeter 11 and transmits this information, along with a identification code, via the transmitter-receiver 5 to comparator 8. The comparator 8 produces an aircraft velocity vector in dependance upon the received information and compares it with terrain height plus a safety margin using values of terrain height from the terrain data base 9 which also contains information relating to obstructions within the region 3.

Under normal conditions the velocity vector of an aircraft will not intercept the terrain height plus a safety margin, however if such an aircraft velocity vector should intercept the safety margin then a coded signal is generated in the comparator 8 and transmitted to the transmitter-receiver 10 which generates an audible warning signal via loud speaker 12 located in the aircraft cockpit.

Figure 3:
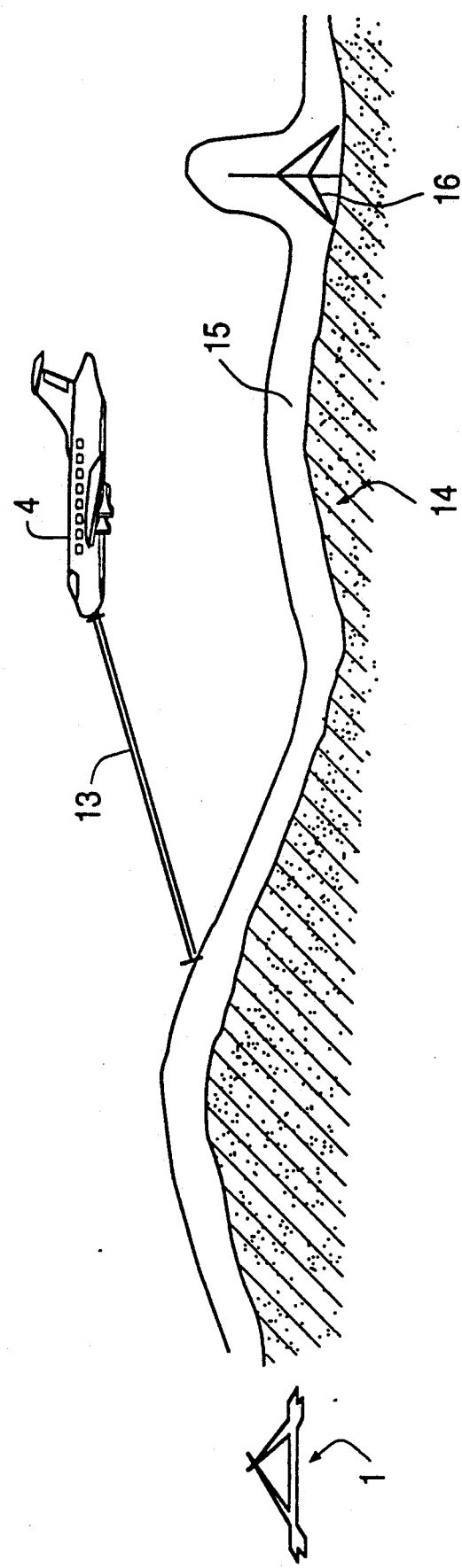
FIG. 3 illustrates the principle of using a velocity vector.

In FIG. 3 the principle of the velocity vector is illustrated. The velocity vector is generated in the comparator 8 by obtaining the lateral velocity of the aircraft 4 from the output of the radar 2 and the vertical velocity by differentiating successive values of altitude obtained from the aircraft 4. This velocity vector can be thought of as a line 13 extending in the direction of flight of the aircraft 4 to a distance equal to the distance that the aircraft 4 will travel in its present condition in a preset time period. This velocity vector is compared with values for the terrain obtained from the terrain data base 9 which provides values for the height of the terrain 14. A safety margin 15 is added to the terrain values to ensure that the aircraft 4 never comes within a predetermined height from the terrain 14, or any obstacle, such as a radio mast 16, the height and position values of which are also stored in the terrain data base 9.

Although this invention has been specifically described with reference to an aircraft it will be appreciated that the invention is equally applicable to marine areas such as harbors or coastal shipping routes where there is risk of collision with sandbanks or the shore line.

I claim:

1. A method of providing a collision warning signal for at least one vehicle, comprising the steps of:
   (a) transmitting from the surface of the earth a radio signal;
   (b) receiving at the surface of the earth, a radio signal returned by a vehicle in response to the radio signal transmitted in step (a);
   (c) determining an elapsed time between the transmitting of the radio signal and the receiving of the corresponding returned radio signal;
   (d) determining the position of the vehicle at least in part in dependence upon the elapsed time determined in step (c);
   (e) comparing the position of the vehicle determined in step (d) with terrain data stored in a data base; and
   (f) generating a warning signal based on the comparing in step (e) if predetermined parameters are satisfied.

2. A method as claimed in claim 1, wherein obstacle positions are also stored in the data base, the method further comprising comparing the determined position of the vehicle with the obstacle positions.

3. A method as claimed in claim 1 further comprising generating a vehicle velocity vector for the vehicle.

4. A method as claimed in claim 3 further comprising projecting the velocity vector forward of the vehicle by a distance which the vehicle will travel in a predetermined period of time if the velocity and heading of the vehicle are maintained.

5. A method as claimed in claim 4 further comprising:
   comparing the projected velocity vector with data stored in the terrain data base, and
   generating a warning signal if the projected velocity vector intersects the terrain.

6. A method as claimed in claim 4 further comprising:
   comparing the projected velocity vector with data stored in the terrain data base, and
   generating a warning signal if the projected velocity vector comes within a predetermined distance of the terrain.

7. A method as claimed in claim 1, wherein the method comprises automatically transmitting the warning signal directly to the vehicle.

8. A method as claimed in claim 7, wherein the at least one vehicle comprises a plurality of vehicles, and wherein the method comprises transmitting a coded warning signal, whereby only a vehicle in danger of collision is responsive to the signal.

9. A method as claimed in claim 1 wherein the at least one vehicle comprises aircraft equipped with a transponder and wherein the method further comprises interrogating a transponder on the aircraft to obtain the altitude of the aircraft.

10. A method as claimed in claim 1 further comprising providing an airport secondary surveillance radar to transmit and receive the signals.

11. A collision warning system based on the surface of the earth comprising:
    a terrain data base containing terrain data;
    a radio signal transmitter for transmitting radio signals;
    a receiver for receiving radio signals returned by a vehicle in response to the radio signals transmitted by said transmitter;
    means for determining an elapsed time between transmission of a radio signal by said transmitter and receipt of a corresponding radio signal returned by a vehicle;
    position determining means for identifying the position of a vehicle at least in part in dependence on said elapsed time; and
    a comparator for comparing the determined position of the vehicle with the terrain data in the terrain data base and generating a warning signal if predetermined parameters are satisfied.

12. A system as claimed in claim 11 wherein the vehicle is an aircraft.

13. A system as claimed in claim 12 wherein the system further comprises communications equipment for communicating with the aircraft, wherein the aircraft carries a transponder, and wherein the transponder is interrogated by the communications equipment and responds with the altitude of the aircraft.

14. A system as claimed in claim 12 wherein the transmitter, the receiver, the means for determining an elapsed time, and the position determining means comprise an airport secondary surveillance radar system.

* * * * *